March 29, 1955

R. D. FOX 2,705,036

PEACH PITTER

Filed Aug. 1, 1950

INVENTOR.
Richard D. Fox
BY
Harper Allen
ATTORNEY

March 29, 1955 R. D. FOX 2,705,036
PEACH PITTER

Filed Aug. 1, 1950 6 Sheets-Sheet 3

INVENTOR.
Richard D. Fox
BY
Harper Allen
ATTORNEY

March 29, 1955  R. D. FOX  2,705,036
PEACH PITTER

Filed Aug. 1, 1950  6 Sheets-Sheet 4

INVENTOR.
Richard D. Fox
BY
Harper Allen
ATTORNEY

INVENTOR.
Richard D. Fox
BY Harper Allen
ATTORNEY

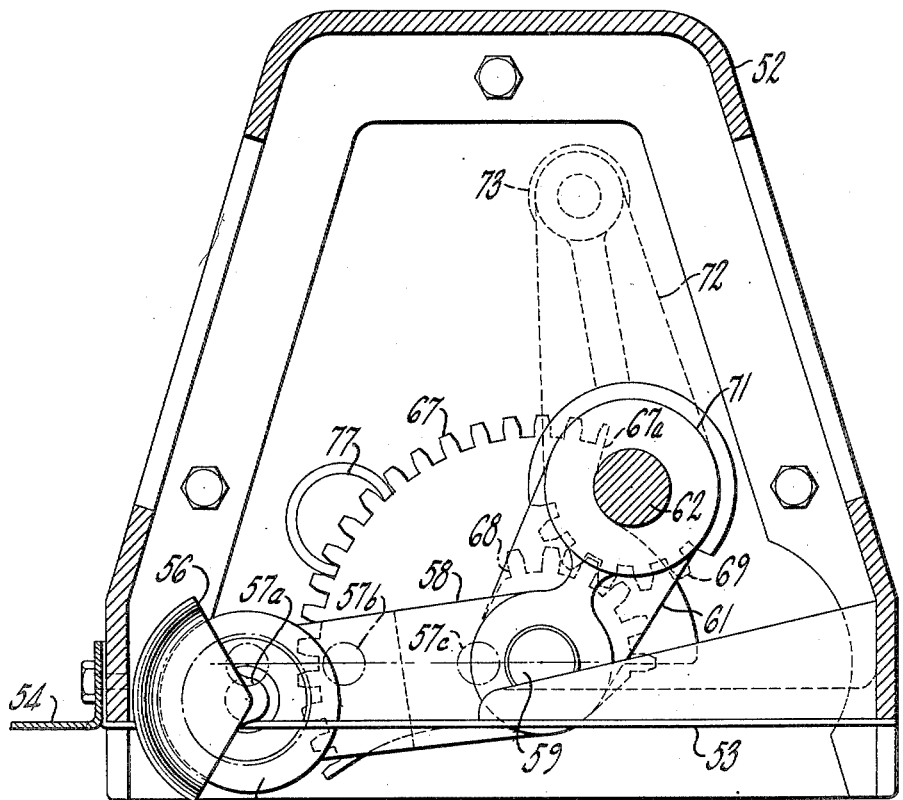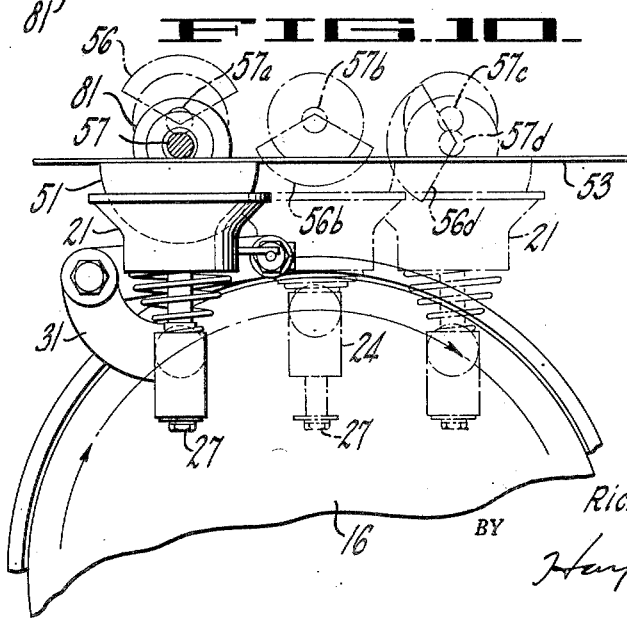

United States Patent Office 2,705,036
Patented Mar. 29, 1955

2,705,036

PEACH PITTER

Richard D. Fox, Santa Clara County, Calif., assignor to Fruit Machinery Company, a corporation of Nevada Application August 1, 1950, Serial No. 177,028

17 Claims. (Cl. 146—28)

The present invention relates to peach pitting apparatus and is concerned more particularly with an apparatus of the above character in which the machine is manually fed peach halves as a part of a pitting or a re-pitting operation.

In peach-pitting apparatus, it is desirable to provide for continuous operation of the machine with automatic alignment and presentation of a peach half to a pitting spoon for removal of the pit half and in accordance with the instant invention, the apparatus is provided with a vertically disposed turret carrying a series of peach-holding devices or cups which are maintained oriented in an upright position during rotation of the turret and are successively presented to a pit-removing spoon as they travel along a flattened portion of their normal circular path during removal of the pit half from the peach half. During the removal of each half-pit, the position of the spoon with respect to the peach half is controlled automatically in accordance with the size of the peach half.

The apparatus is designed for compactness and simplicity of construction and for advantageous arrangement of the peach receiving cups with respect to the operator for easy feeding thereof.

The above and other objects of the invention are obtained as illustrated in a preferred embodiment of the invention shown in the accompanying drawings, in which:

Figure 9 is a fragmentary sectional view illustrating the drive and control of the peach-pitting spoon.

Figure 10 is a schematic view illustrating the operation of a peach-holding cup with reference to the pitting spoon as it travels through the pitting zone.

Figure 1:
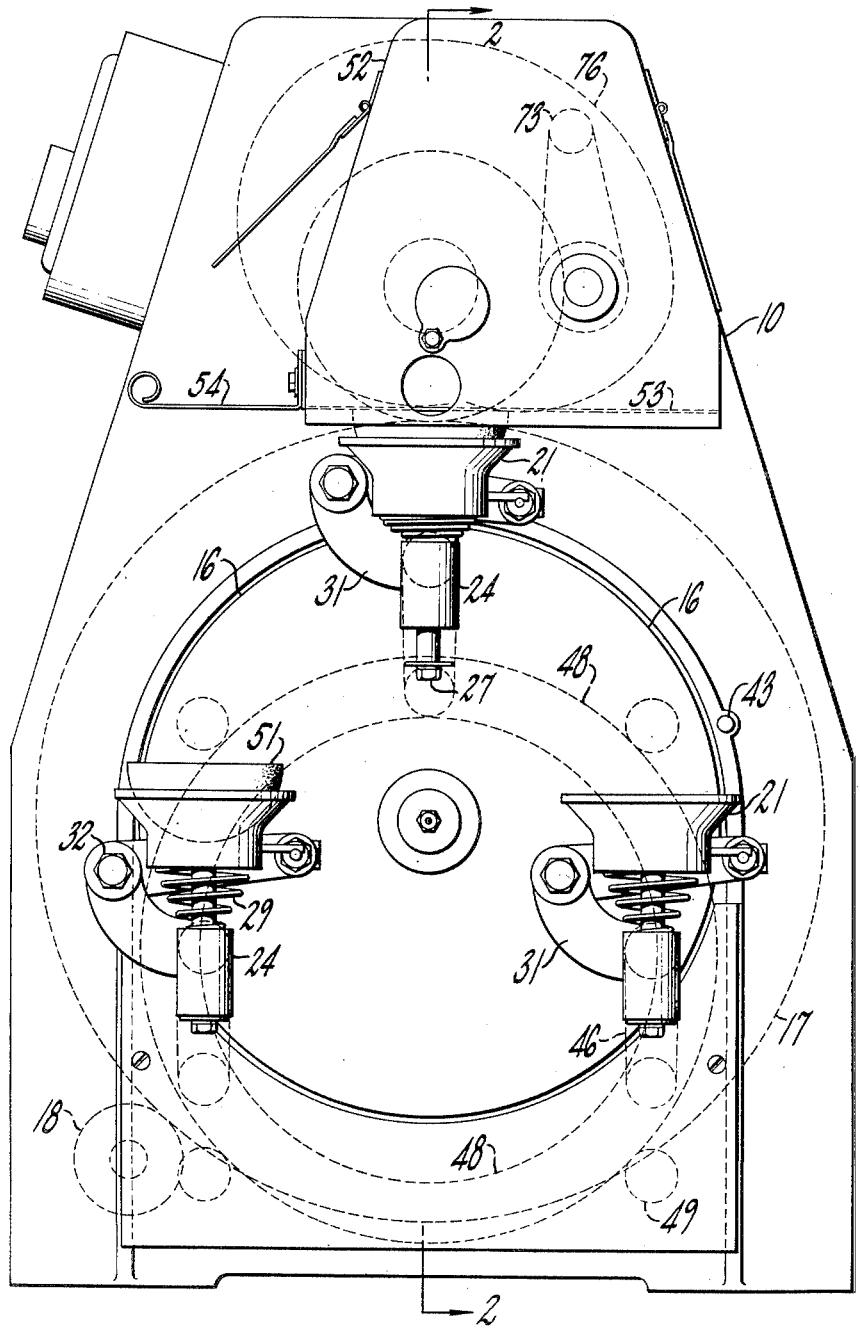
Figure 1 is a front elevational view of the machine.
Figure 2:
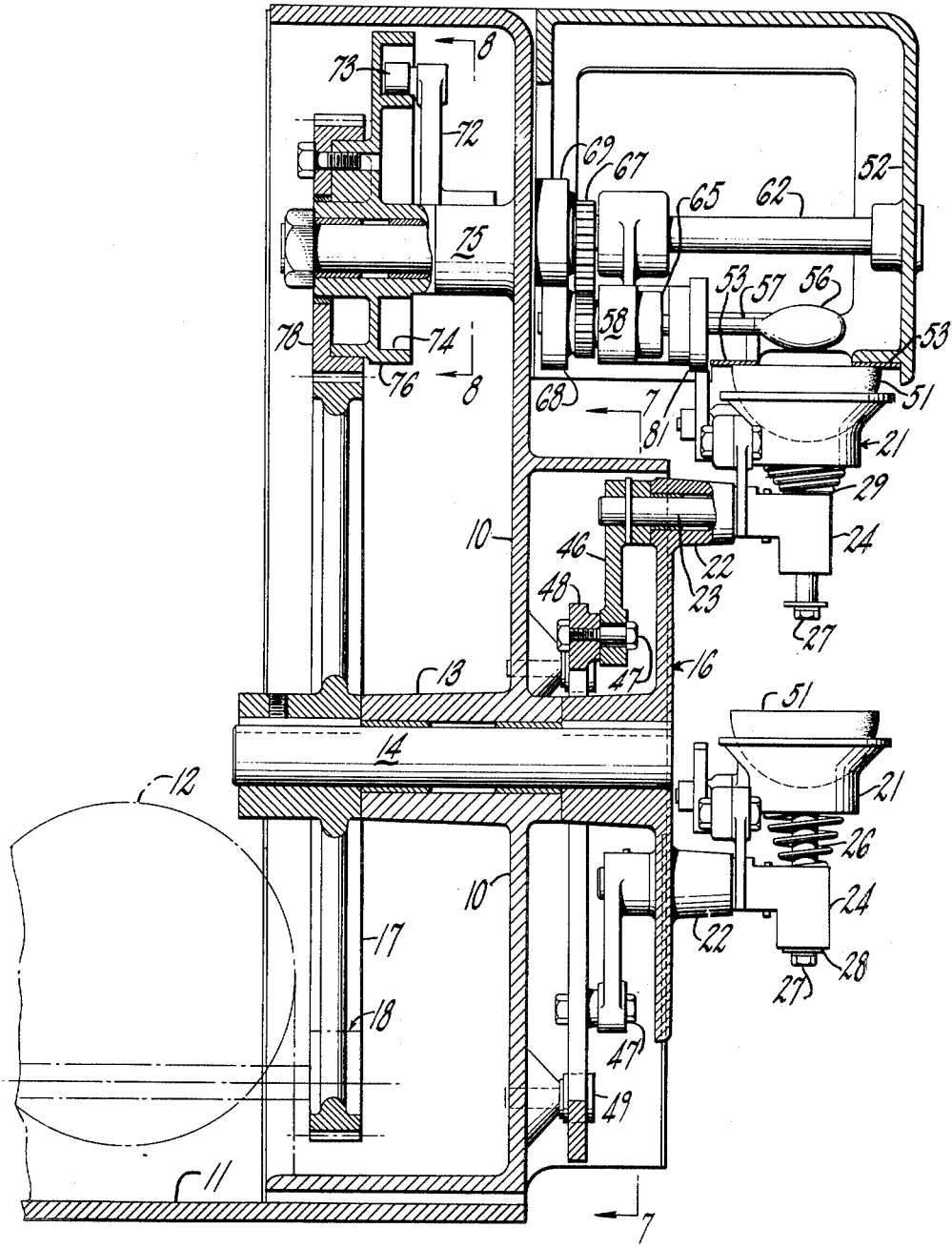
Figure 2 is a vertical sectional view taken as indicated by the line 2—2 in Figure 1.

Referring particularly to Figures 1 and 2, the peach pitting machine includes a frame 10 of cast construction having a base portion 11 on which a suitable electric motor 12 is mounted. The center upright wall of the housing 10 has a boss 13 in which a shaft 14 is journalled carrying at one end the hub of a vertically disposed turret 16, referred to in greater detail hereinafter, and at the other end a drive gear 17 engaged with the motor pinion 18.

Figure 6:
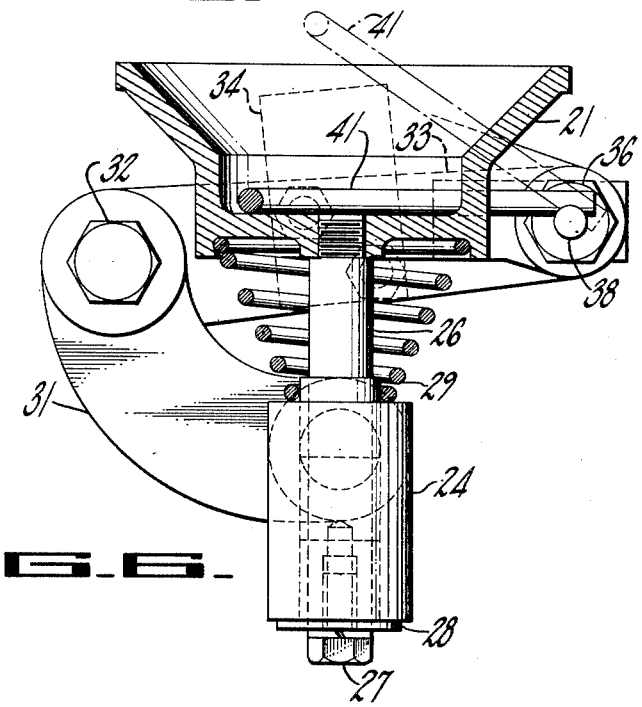
Figure 6 is a sectional view of a peach-holding cup taken as indicated by the line 6—6 in Figure 5.

The feed turret 16 of the apparatus carries a plurality of evenly spaced peach-holding cups 21 having fruit-carrying cavities and for this purpose is provided with a plurality of bosses 22 in each of which there is pivotally journalled a cup support shaft 23, and each shaft has pinned on its outer end a cup mounting bracket 24. As seen in Figure 6 each cup 21 has a central threaded aperture to receive a support rod 26 which is carried by spaced guide bushings in the vertically disposed boss of the support bracket 24 and is threaded at its lower end to receive a stop screw 27 having a washer 28 associated therewith. A spring 29 of conical-helical contour is disposed between the cup 21 and the top of the support bracket 24 to normally maintain the cup 21 elevated. Associated with the cup support bracket 24 and the cup 21 is a depth control arm to determine the depth of cut of the pitting spoon with reference to a peach in the cup 21, as later described in detail, and for this purpose, the support bracket 24 is provided with an upwardly projecting arm 31 carrying a pivot stud 32 for a aligning control arm 33 having an upwardly projecting finger 34 secured thereto by a pair of cap screws 35. At its opposite end the arm 33 has a threaded aperture to receive a bored support stud 36 passing through a slotted ear 37 of the cup 21. A pivot stud 38 is mounted in the stud, carrying at one end an operating arm 39 and at the other end a peach half ejector ring 41 which extends inwardly through a slotted portion of the cup 21 and is disposed within a central recess 42 thereof. During rotation of the turret, each arm 39 engages and is operated by a pin 43 (Figures 1 and 7) on the frame 10.

Figure 7:
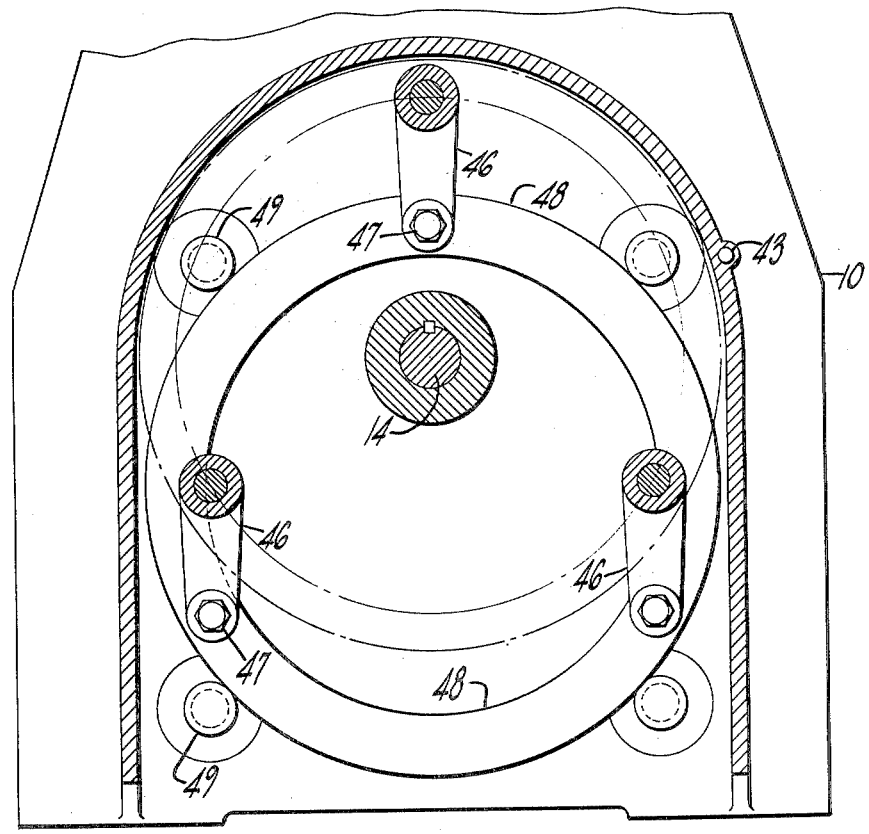
Figure 7 is a sectional view taken as indicated by the line 7—7 in Figure 2, and illustrating the linkage arrangement for controlling the upright position of the cups.

In order to control the cups 21 to maintain the upright position thereof a linkage control means is connected to the cups 21 and the turret 16. Each of the support shafts 23 for the cups 21 has pinned at the left end thereof as seen in Figure 2, a control arm 46 which is pivotally connected to a stud 47 carried by a control ring 48 (Figures 1, 2, and 7). The ring 48 is mounted eccentrically with respect to the turret 16 by a distance corresponding to the length of the arms 46, and the ring 48 is mounted for rotation by four equally spaced apart supporting rollers 49. Thus, as the turret 16 rotates clockwise as viewed in Figure 7, the linkage connection thereof by means of the three arms 46 to the ring 48 causes the arms 46 to maintain an upright position and correspondingly causes the cups 21 to maintain their appropriate upright position as seen in Figure 1.

The cups 21 as they are travelling around the lower part of their path of travel have manually fed thereto a peach half 51, as seen at the left of Figure 1 for example, which has its stem-blossom axis placed parallel to the plane of the turret for a subsequent cooperative relation with a pitting spoon as will now be described. The frame 10 has secured thereon a spoon housing 52 (Figure 2) which lies over the path of travel of the turret and has a pair of spaced apart peach guide strips or plates 53 secured thereon and extending across the upper portion of the circular path of travel of the cups so as to be engaged by the yieldably mounted cup or a peach therein and flatten the upper portion of its travel so that the travel is across a chordal distance of the circle of travel determined by the time at which the guide strips 53 are engaged by the peach half or a peach supporting cup. A feed and guard plate 54 (Figure 1) is provided for initial contact of the peach half in leading it onto the strips 53. The strips 53 are spaced apart a distance slightly greater than the width of the peach pitting spoon 56.

Figure 3:
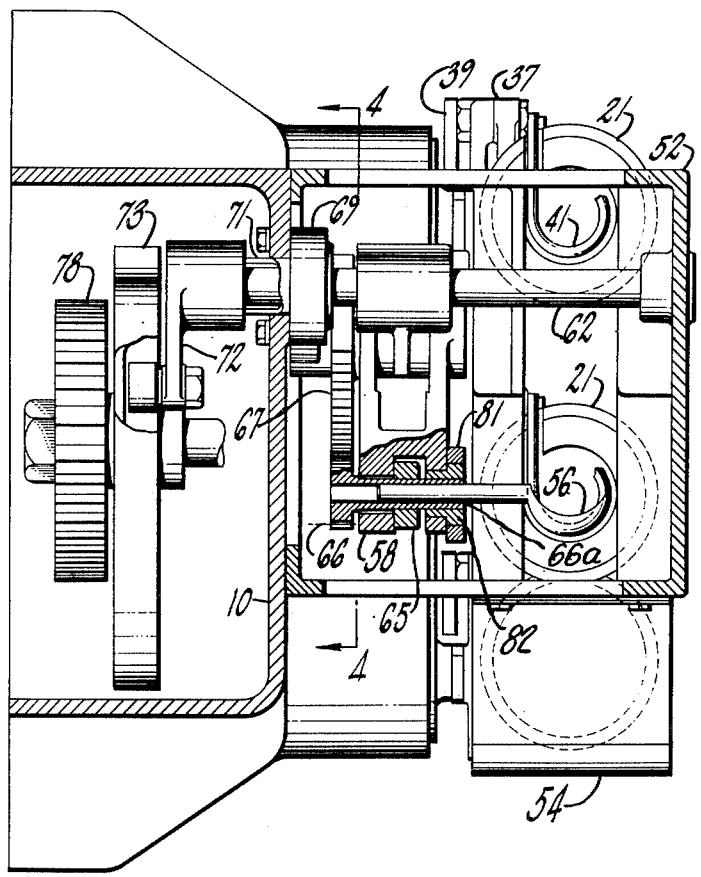
Figure 3 is a plan view of the apparatus with certain parts broken away and shown in section to illustrate details of construction.

The spoon 56 (Figures 2, 3, and 9) is of conventional construction and is carried by a shaft 57 releasably secured in the sleeve extension 66–a of a pinion 66 rotatably journalled in the free end of an H-shaped link 58. The knife shaft 57 has a floating support on the adjacent strip 53. The link 58 is pivotally connected at its other end by a pivot stud 59 to a depending rock arm 61 secured on a rock shaft 62, referred to in greater detail hereinafter.

Figure 4:
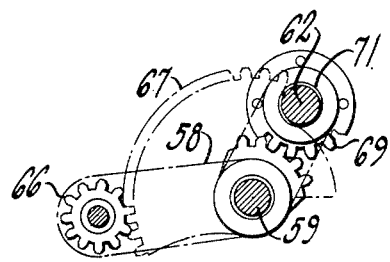
Figure 4 is a fragmentary sectional view taken as indicated by the line 4—4 in Figure 3.
Figure 8:
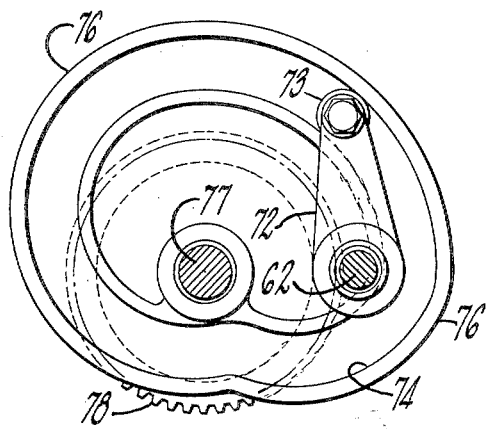
Figure 8 is a sectional view of a cam mechanism taken as indicated by the line 8—8 in Figure 2.

The spoon 56 is provided with two motions during the travel of a peach half across the strips 53, one of these being a linear travel coinciding with the linear path of travel of the cup 21 and the other of these being a rotative movement, both of these movements being controlled by the link 58, the rock arm 61 and associated parts. The pinion 66 (Figures 3 and 4) with a collar 65 secures the sleeve extension 66–a and the shaft 57 against endwise movement relative to the link 58. Pinion 66 meshes with a gear segment 67 carried on the shaft 59 and having a cutaway clearance portion 67–a adjacent the shaft 62. Formed integrally with the large gear segment 67 is a second gear segment 68 meshing with a stationary gear segment 69 disposed about the rock shaft 62 and bolted to the case. The shaft 62 (Figures 3, 4 and 9) is journalled in a bearing 71 secured in the upright wall of the housing 10 and carries a cam follower arm 72 having a roller 73 (Figures 2 and 8) engaged with a cam track 74 of a cam member 76. Cam member 76 is carried by a shaft 77 journalled in a frame boss 75 and has secured thereto a gear 78 which meshes with the main drive gear 17. The cam 76 rotates counter-clockwise as viewed in Figure 8 so that the cam arm 72 and the arm 61 will be rotated counter-clockwise from the position shown to pull the link 58 and the spoon 56 to the right as viewed in Figure 9. This same movement also causes counter-clockwise movement of the gear segment 67 so that the spoon is given a partial rotation during its linear movement to the right to cut the pit half from the peach half. After travel of the cup across the pitting zone, the pitting spoon and associated parts are returned by the cam mechanism to their starting position.

Figure 5:
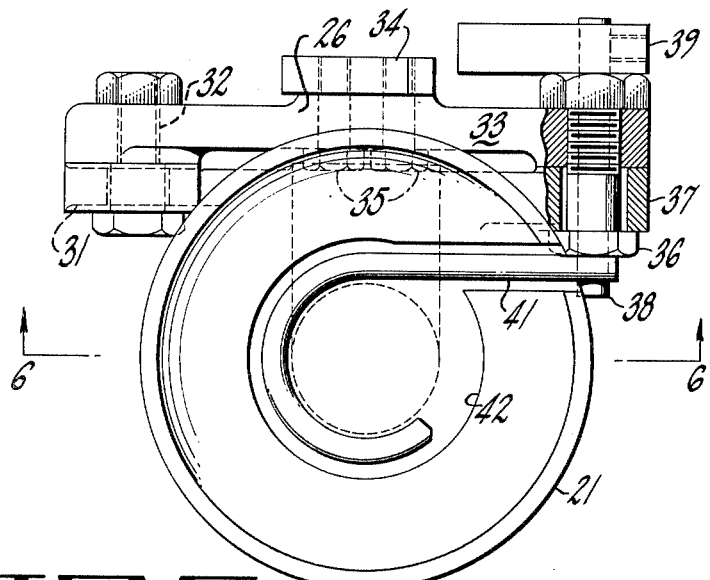
Figure 5 is a plan view of one of the peach-holding cups.

Means is provided to control the depth of cut of the spoon in accordance with the sizze of the peach half. As previously described, each cup assembly carries an upstanding finger 34 (Figures 2, 5 and 6) and this finger is in vertical alignment with an eccentric ring 81 (Figures 2, 3 and 9) adjustably mounted on a bushing 82 on the sleeve extension 66–a of the pinion 66. When a cup moves into the pitting zone, the active finger 34 engages the eccentric 81 and lifts the shaft 57 and the spoon 56 until the peach half engages the plates 53, the amount of lift depending upon the size of the peach half. With an empty cup the maximum lift is obtained. The eccentric is adjusted to determine the range of lift depending upon the type and grade of peach being processed. Figure 10 illustrates in dotted lines at 57–a, b, c and d, and 56–a, b, c and d, a possible path of travel of the spoon shaft and the spoon for a given size peach half 51. Correspondingly, there is indicated in Figure 9, corresponding rotative positions of the shaft 57 at 57–a, 57–b, and 57–c.

The operation of the pitter can be briefly summarized as follows: With the turret rotating clockwise, as viewed in Figure 1, the operator feeds the successive peach halves 51 into the cups 21. As a peach half arrives at the upper portion of the travel of the turret it engages the guide plate 54 to be oriented thereby in the cup 21 and slides on to the spaced strips or blades 53 into the actual pitting zone, the stem blossom axis of the pit having been placed transversely of the axis of the pitting shaft 57 by the operator. At this time also the depth control finger 34 has engaged the eccentric 81 on the spoon shaft 57 and lifted the spoon 56 to control its depth of cut in accordance with the size of the peach half. As the center of the cup 21, i. e. the peach pit, moves into alignment with the pitting spoon 56 the cam 76 operates the rock shaft 62 so that the pitting spoon begins to travel with the peach half and begins to rotate to perform the pitting operation. The principal operating positions of the pitting spoon 56 and its support shaft 57 are indicated in Figures 9 and 10.

After the pitting operation is complete, the cup 21 continuing its travel moves until the cam 39 (Figure 5) engages the pin 43 (Figure 1) so that the ejector 41 lifts the peach half from the cup for delivery to a suitable conveyor or receptacle not shown.

While I have shown a preferred embodiment of the invention, it will be understood that the invention is capable of variation and modification from the particular form shown, so that its scope should be limited only by the scope of the claims appended hereto.

I claim:

1. In a peach pitter, a frame, a vertically disposed turret mounted on said frame for rotation about a horizontal axis, a fruit carrying cup carried by said turret for rotation through a circular path and having a fruit-carrying cavity facing in a direction at right angles to said axis, pitting means for engagement with a fruit half in said cup during a portion of the travel of a cup along its path, and cup-position control means for maintaining said cup with said cavity in facing position with respect to said pitting means and with said cavity always facing in a direction at right angles to said turret axis.

2. In a peach pitter, a frame, a vertically disposed turret mounted on said frame for rotation about a horizontal axis, a fruit-carrying cup, means for movably mounting said cup on said turret and for positioning said cup to face in a direction at a right angle to said axis, pitting means mounted on said frame and positioned in the same general vertical plane with said cup for engagement with a fruit half in said cup during travel of said cup through a pitting zone, and cup-position control means connected to said cup and to said turret to cause translatory rotation of said cup with said turret about an axis parallel to said horizontal axis.

3. In a peach pitter, a frame, a vertically disposed turret mounted on said frame for rotation about a horizontal axis, a fruit carrying cup having a fruit-carrying cavity facing at a right angle from said axis, a support shaft connected to said cup and pivotally mounted in said turret about an axis parallel to said horizontal axis, rotary position control means mounted on said frame about an axis parallel to and displaced from said turret axis, a link pivotally connected to said position control means and secured to said support shaft, and pitting means on said frame for engaging a fruit half in said cup.

4. In a peach pitter, a frame, a vertically disposed turret mounted on said frame for rotation about a horizontal axis, a fruit-carrying cup, a support bracket for said cup having a vertically yieldable sliding connection therewith, a support shaft connected to said bracket and pivotally mounted in said turret, rotary position control means mounted on said frame about an axis parallel to and displaced from said turret axis, a link pivotally connected to said position control means and secured to said support shaft, and pitting means on said frame for engaging a fruit half in said cup.

5. In a peach pitter, a frame, a vertically disposed turret mounted on said frame for rotation about a horizontal axis, a support shaft pivoted on said turret about another horizontal axis, a cup support bracket secured on said shaft and having a vertically disposed apertured boss, a cup having a support rod slidably mounted in said boss, a spring interposed between said boss and said cup, a substantially horizontally disposed control arm pivoted to said bracket at one side of said cup and having a slidable pivotal connection with said cup at the other side thereof, rotary position control means connected to said support shaft to maintain an upright position of said cup, and pitting means on said frame for engaging a fruit half in said cup.

6. In a peach pitter, a frame, a vertically disposed turret mounted on said frame for rotation about a horizontal axis, a support shaft pivoted on said turret about another horizontal axis, a cup support bracket secured on said shaft and having a vertically disposed apertured boss, a cup having a support rod slidably mounted in said boss, a spring interposed between said boss and said cup, a substantially horizontally disposed control arm pivoted to said bracket at one side of said cup and having a slidable pivotal connection with said cup at the other side thereof, rotary position control means connected to said support shaft to maintain an upright position of said cup, and pitting means having a floating mounting on said frame for engaging a fruit half in said cup, and a depth control finger carried by said control arm for engaging said pitting means.

7. In a peach pitter, a frame, a vertically disposed turret mounted on said frame for rotation about a horizontal axis, a support shaft pivoted on said turret about another horizontal axis, a cup support bracket secured on said shaft and having a vertically disposed apertured boss, a cup having a support rod slidably mounted in said boss, a spring interposed between said boss and said cup, a substantially horizontally disposed control arm pivoted to said bracket at one side of said cup and having a slidable pivotal connection with said cup at the other side thereof, rotary position control means connected to said support shaft to maintain an upright position of said cup, and pitting means having a floating mounting on said frame for engaging a fruit half in said cup, said pitting means including an adjustable member, and a depth control finger carried by said control arm for engaging said adjustable member to lift said pitting means with respect to said cup during the pitting operation.

8. In a peach pitter, a frame, a vertically disposed turret mounted on said frame for rotation about a horizontal axis, a cup having a yieldable mounting on said turret, means connected to said cup and said turret for maintaining an upright position of said cup, a control finger mounted on said turret for yielding movement with said cup, a pair of parallel guide and stop plates carried by said frame and disposed across the path of travel of the cup at the upper portion thereof for engagement by a peach half in the cup, pitting means having a floating mounting on said frame for reciprocating movement along said plates in time with the travel of said cup, and means carried by said pitting means for engagement by said control finger to position said pitting means in accordance with the size of a peach half in said cup.

9. In a peach pitter, a frame, a vertically disposed turret mounted on said frame for rotation about a horizontal axis, a cup having a yieldable mounting on said turret, a control finger mounted on said turret for yielding movement with said cup, guide means carried by said frame and disposed across the path of travel of the cup at the upper portion thereof for engagement by a peach half in the cup, pitting means having a floating mounting on said frame for reciprocating movement along said guide means in time with the travel of said cup, and means carried by said pitting means for engagement by said control finger to position said pitting means in accordance with the size of a peach half in said cup.

10. In a peach pitter, a frame, a vertically disposed turret mounted on said frame for rotation about a horizontal axis, a cup assembly having a yieldable mounting on said turret and including a control finger, guide means carried by said frame and disposed across the path of travel of said cup assembly, pitting means having a floating mounting on said frame, means for operating said pitting means including means for effecting movement thereof along said guide means in time with the movement of a cup assembly therealong and for simultaneously effecting pitting movement thereof, and means carried by said pitting means for engagement by said control finger to position said pitting means with respect to said cup assembly in accordance with the size of a peach half in said cup.

11. In a peach pitter, a frame, a vertically disposed turret mounted on said frame for rotation about a horizontal axis, a cup assembly, yieldable mounting means for supporting said cup assembly on said turret including means for mounting said cup assembly facing in a direction at right angles to said axis, guide means carried by said frame and disposed across the path of travel of said cup assembly, pitting means having a floating mounting on said frame, and means for operating said pitting means including means for effecting movement thereof along said guide means in time with the movement of a cup assembly therealong and for simultaneously effecting pitting movement thereof.

12. In a peach having a turret carrying a plurality of peach holding means, a pitting assembly for successive co-operation with said peach holding means comprising a rock shaft operated in time with the movement of said turret, a depending rock arm on said shaft, a floating link pivoted about an axis at one end to said rock arm, a spoon shaft carried at the other end of said link and having a pitting spoon thereon, a support for said spoon shaft, a spoon gear on said spoon shaft, a segmental gear meshed with said spoon gear and having a hub journalled coaxially with said axis for movement with said link, and a gear connection between said hub and said rock shaft.

13. In a peach pitter, a frame, a vertically disposed turret mounted on said frame for rotation about a horizontal axis, a cup having a fruit carrying cavity, mounting means for supporting said cup on said turret with the cavity of said cup facing at right angles to said axis and for pivoting movement about an axis parallel to said horizontal axis, said mounting means including means providing for yielding movement of the cup in a direction parallel to the face of the turret, pitting means for engagement with a fruit half in said cup during a portion of the travel of the cup along its path, cup-position control means for maintaining said cup with said cavity in upwardly disposed facing position with respect to said pitting means, for at least said portion of travel, and means for causing said cup to travel in a chordal path with respect to said turret during said portion of said travel.

14. In a peach pitter, a frame, a vertically disposed turret mounted on said frame for rotation about a horizontal axis, a fruit carrying cup carried by said turret and having a fruit carrying cavity therein normally facing in a direction at right angles to said axis, said cup being movable with said turret through a feeding zone and a pitting zone, pitting means disposed in vertical alignment with said cup for engagement with a fruit half in said cup during travel of the cup through said pitting zone, and cup positioning control means for maintaining said cup with said cavity in facing position with respect to said pitting means during travel through said feeding and pitting zones.

15. In a peach pitter as recited in claim 14 in which said cup projects from a face of said turret and the face of said turret adjacent said cup is otherwise free providing the cup in an accessible position for feeding of a fruit half and for pitting of a fruit half.

16. In a peach pitter as recited in claim 14 in which the mounting means for the fruit carrying cup on said turret comprises means providing for sliding movement of the cup parallel to the turret, and means providing for rotation of said cup about an axis parallel to the turret axis.

17. In a peach pitter as recited in claim 14 in which the pitting means is disposed vertically above the path of said fruit cup, and said fruit cup is maintained in upright position with the cavity disposed upwardly while passing by said pitting means.

References Cited in the file of this patent

UNITED STATES PATENTS

| | | |
|---|---|---|
| 1,785,014 | Norgaard | Dec. 16, 1930 |
| 2,376,526 | Thompson | May 22, 1945 |
| 2,428,157 | Healy | Sept. 30, 1947 |
| 2,443,863 | Lindley, Jr. | June 22, 1948 |
| 2,457,840 | Skog | Jan. 4, 1949 |
| 2,526,712 | Thompson | Oct. 24, 1950 |
| 2,533,350 | Cahill | Dec. 12, 1950 |
| 2,622,002 | Kingsbury | Dec. 16, 1952 |

FOREIGN PATENTS

| | | |
|---|---|---|
| 6,169/32 | Australia | Feb. 12, 1932 |
| 112,506 | Australia | Feb. 6, 1941 |